N. P. CHANEY.

Churn.

No. 81,599.

Patented Sept. 1, 1868.

Witnesses:

Inventor,
N. P. Chaney
per Munn & Co.
Attorneys

United States Patent Office.

N. P. CHANEY, OF POTSDAM, NEW YORK.

Letters Patent No. 81,599, dated September 1, 1868.

IMPROVEMENT IN CHURNS.

*The Schedule referred to in these Letters Patent and making part of the same.*

TO ALL WHOM IT MAY CONCERN:

Be it known that I, N. P. CHANEY, of Potsdam, in the county of St. Lawrence, and State of New York, have invented a new and improved Churn; and I do hereby declare that the following is a full, clear, and exact description thereof, which will enable others skilled in the art to make and use the same, reference being had to the accompanying drawings, forming part of this specification.

The nature of my invention relates to improvements in churns, the object of which is to provide a churn having beaters provided with air-passages, to convey the air down into the cream while it is being agitated, and scrapers for scraping the cream off the inside of the cover, arranged in such a manner as to scrape it away from around the opening for the shaft, and thereby preventing it from oozing up through the cover around the shaft, as will be more fully described on reference to the accompanying drawings, wherein—

Figure 1:
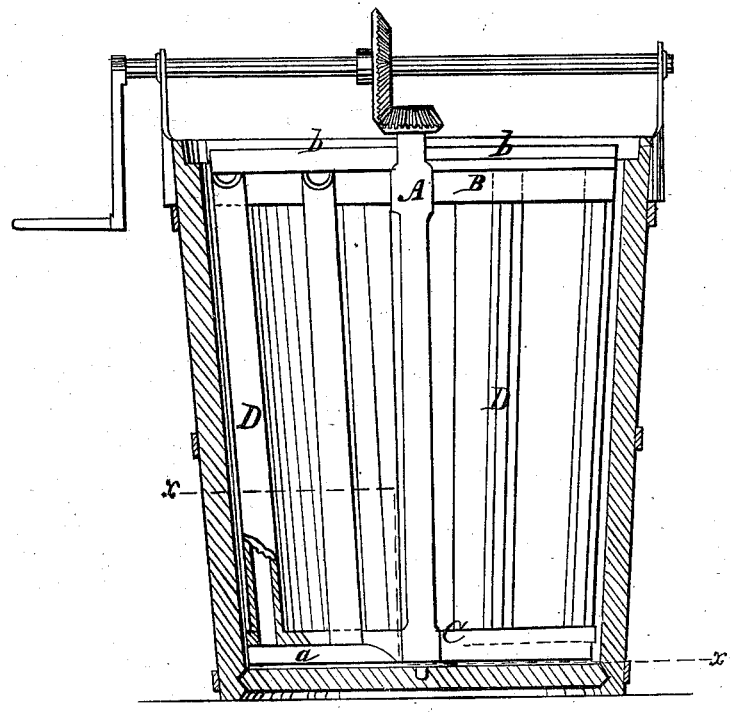
Figure 2:
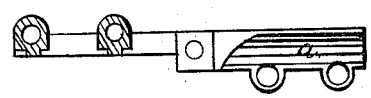

Figure 1 represents a central sectional elevation of a churn with my improvement, and Figure 2 represents a partial section and end view of the lower end of the beater-frame Similar letters of reference indicate corresponding parts.

A represents a vertical shaft, provided with the cross-pieces B and C, which is rotated by gear operated by a hand-crank, in the usual manner. To the said cross-pieces are fixed the vertical beaters D D, which have cylindrical holes through them from end to end, for conveying the air down to the bottom of the churn. The cross-piece C is recessed on its lower end and rear edges, as shown at $a$, whereby, in its rotary movement in the cream, partial vacuums are formed behind and under each arm of the cross-piece where the said cylindrical openings through the beaters communicate with the said cross-piece, which greatly facilitates the admission of air to be mixed with the cream, from which very beneficial results are obtained in the process of churning, as is well understood. The upper arm, B, is provided with scrapers, $b\ b$, arranged as shown in the drawings, for removing the cream that adheres to the cover, and for preventing it from working up through the cover, at the opening for the shaft.

Having described my invention, I claim as new, and desire to secure by Letters Patent—

The combination, with the tubular beaters D, of the arm B, provided with the scrapers $b\ b$, substantially as and for the purpose described.

The above specification of my invention signed by me, this 27th day of March, 1868.

N. P. CHANEY.

Witnesses:
S. C. CRANE,
O. M. BAKER.